(No Model.)
H. RUNDLETT & F. A. HOYT.
WATER HEATER.
No. 492,615. Patented Feb. 28, 1893.
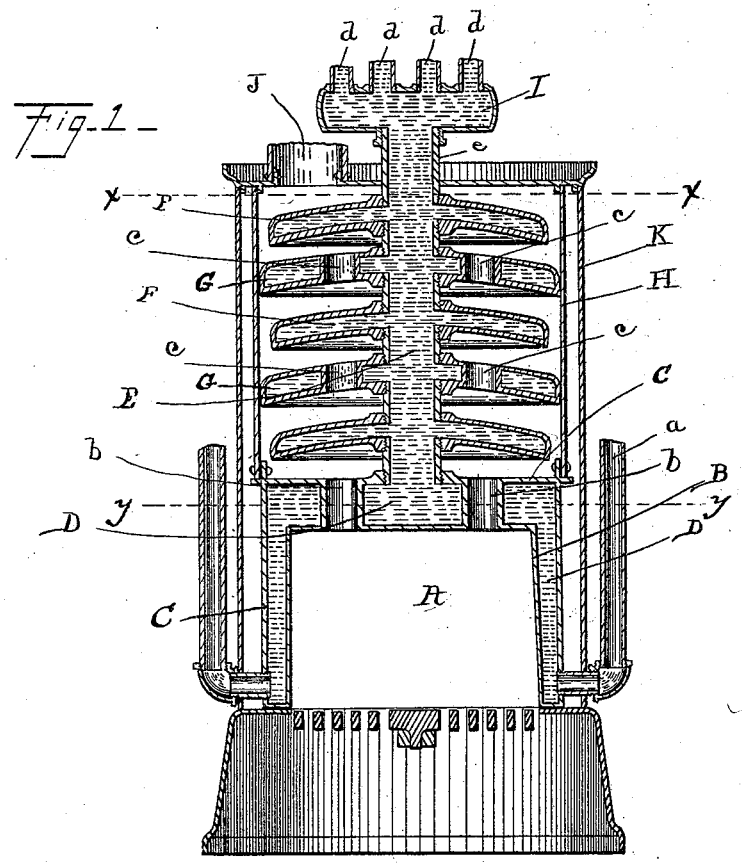
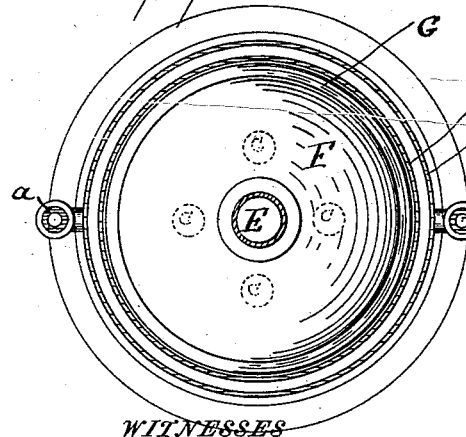
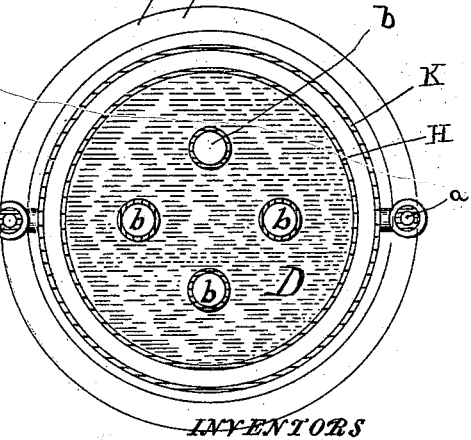
WITNESSES
Claude Kesler
Henry V. Calver
INVENTORS
Howard Rundlett
Frederick A. Hoyt
by John J. Halsted Son, his Attorneys

UNITED STATES PATENT OFFICE.

HOWARD RUNDLETT, OF SOUTH NEW MARKET, NEW HAMPSHIRE, AND FREDERICK A. HOYT, OF MELROSE, MASSACHUSETTS, ASSIGNORS TO THE SWAMPSCOT MACHINE COMPANY, OF SOUTH NEW MARKET, NEW HAMPSHIRE.

WATER-HEATER.

SPECIFICATION forming part of Letters Patent No. 492,615, dated February 28, 1893.

Application filed April 18, 1892. Serial No. 429,674. (No model.)

*To all whom it may concern:*

Be it known that we, HOWARD RUNDLETT, of South New Market, Rockingham county, New Hampshire, and FREDERICK A. HOYT, of Melrose Highlands, Middlesex county, Massachusetts, have invented certain new and useful Improvements in Water-Heaters; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention relates to water heaters such as are used for heating water and distributing and circulating it through a series of pipes and radiators, to heat one or more apartments.

The principal object of our invention is to furnish a heater that will fully utilize the products of combustion on their way to the chimney, so as to rapidly and thoroughly heat the water in the heater, and cause a most effective circulation of the hot water from said heater to the radiator or radiators.

Another object of our invention is to cause, by said complete utilization of the products of combustion, such a rapid distribution and radiation of the water, by its absorption of heat, that the heater itself, and the apartment in which it is situated, will remain comparatively cool, while the radiators will be most effectively heated.

Still another object of our invention is to provide such a simple construction of heater that it can be readily and simply put together and taken apart.

Our invention consists generally in surrounding the sides and top of the fire pot, except the outlets for the products of combustion, with a continuous water chamber.

Our invention also consists in connecting the transverse water section forming the ceiling of the fire pot with a centrally or approximately centrally located water column, having attached to said column a series of transverse water sections, every other one of which has a space between its perimeter and the wall of the heater, and the remaining sections extending to said wall, but provided with vertical openings, whereby the smoke and products of combustion can pass through said spaces and openings in a circuitous path from the fire pot to the smoke pipe, and thus be utilized to the fullest extent to heat the water and then distribute it.

Our invention further consists in certain features and details, as more particularly hereinafter described.

In the accompanying drawings—Figure 1 illustrates a vertical section of our improved heater. Fig. 2 is a transverse section through the line $x, x$, of Fig. 1. Fig. 3 is a transverse section through the line $y, y$, of Fig. 1.

Similar letters represent like parts in all the figures.

A is the fire pot, B is the casing surrounding the same, except at its bottom, and C is an exterior casing surrounding the casing B, through which the water inlet pipes $a\ a$ are admitted. The fire pot A will thus be almost entirely surrounded by a continuous water chamber D.

E is a vertical water column or chamber, the lower end of which connects centrally, or approximately so, with the transverse upper portion of the chamber D, or in other words with the water ceiling of the fire pot A.

F G are a series of transverse water sections, connected at or near their centers with the water column E, and situated a small distance apart.

The transverse section of the chamber D is provided with two or more eccentric smoke passages $b\ b$, extending from the fire pot A to the space above said section. The water section F which is the next one above the chamber D, and every alternate section F extend to within a short distance of the wall H of the heater, and the other alternate water sections G extend to and come in contact with the wall H, and said sections G are provided with vertical, eccentric smoke passages $c\ c$ similar to the passages $b\ b$ in the section D.

The upper end of the water column E terminates in a transverse water section I above the heater, to which are connected the several small distributing pipes d, which carry the hot water to the radiators.

The upper extremity of the heater is provided with a smoke outlet J, the course of the products of combustion being from the fire pot through the passages b, under, around, and beyond the lower section F, between said section and the wall H, under the next section G, through the passages c c in said section, under, around, and beyond the second section F between the same and the wall H, under the next section G, up through the passages c, under and around the last section F, and thence through the smoke outlet J. A circuitous course will thus be made by the products of combustion, from the fire pot A to the outlet J, utilizing the heat from the same most completely, in its course, and thus causing such a rapid heating of the water, and consequent expansion and circulation of the same, as to send out and distribute said heated water from the heater to the radiators thoroughly, and consequently to thoroughly heat said radiators while the rapid circulation will keep removing the hot water from the heater so rapidly, and returning it to the chamber D through the pipes a a, that said heater will remain comparatively cool, so as to render the apartment in which it is located likewise cool or unheated, while the apartments in which the radiators are located, are warmed to their fullest extent.

In order to better protect the heater, and prevent the radiation of heat in the room in which said heater is located, we surround the walls of the same with an outer casing K, which thus forms an air jacket between said casing and the inner casing H.

We have shown in the drawings a very simple and advantageous method of forming the wall of the water column E, of attaching the same to the section D, and of connecting the water sections F and G with said water column.

The tube of the water column E is formed of a series of short sections or thimbles e, screw threaded exteriorly at each end. One end of one of these thimbles e is screwed into a hole made in the upper transverse portion of the casing C. The sections F and G have central, or approximately central vertical holes which are interiorly threaded, and said sections are connected together by the thimbles e, by each end of said thimbles being screwed into one of the holes of said sections; the lower section F being screwed onto the lowest thimble e, which is screwed into the casing C. The section I is connected with the uppermost thimble e, which extends beyond the heater, in a similar manner to that in which the lowermost thimble e and water section D are connected.—It will be readily seen that this construction will allow of the several parts being readily removed or replaced.

What we claim as new, and desire to secure by Letters Patent, is—

1. A water heater having a central or approximately central water column communicating with the transverse water chamber over the fire pot, a series of transverse water sections connected with said water column, every alternate one extending to the walls of the heater, and the remaining ones not extending to said walls, those extending to the walls having a smoke passage or passages through them, and the water chamber over the fire pot also having a smoke passage or passages through it, all as set forth.

2. In a water heater, the combination of a continuous water chamber surrounding the walls and top of the fire pot, and provided with a smoke passage or passages, a central or approximately central water column communicating with the transverse portion of said water chamber over the fire pot, a series of transverse water sections connected with said water column, every alternate one extending to the walls of the heater and having a smoke passage or passages through them, and the remaining sections not extending to said walls, all as set forth.

HOWARD RUNDLETT.
FRED A. HOYT.

Witnesses to the signature of Howard Rundlett:
WILLIAM H. BELKNAP,
FRANK CURRIER.

Witnesses to the signature of Frederick A. Hoyt:
PENNINGTON HALSTED,
AMOS PAUL.